United States Patent
Grüne et al.

(10) Patent No.: US 10,307,741 B2
(45) Date of Patent: Jun. 4, 2019

(54) SHAPED CATALYST BODY FOR THE CATALYTIC OXIDATION OF $SO_2$ INTO $SO_3$

(71) Applicant: BASF SE, Ludwigshafen (DE)

(72) Inventors: Philipp Grüne, Mannheim (DE); Christian Walsdorff, Ludwigshafen (DE); Markus Schubert, Ludwigshafen (DE); Holger Borchert, Offstein (DE); Jacob Cornelis Van Dorland, Hemsbach (DE); Jürgen Zühlke, Speyer (DE); Stefan Lipp, Karlsruhe (DE); Michael Krämer, Katzweiler (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/562,019

(22) PCT Filed: Mar. 16, 2016

(86) PCT No.: PCT/EP2016/055670
§ 371 (c)(1),
(2) Date: Sep. 27, 2017

(87) PCT Pub. No.: WO2016/156042
PCT Pub. Date: Oct. 6, 2016

(65) Prior Publication Data
US 2018/0104674 A1  Apr. 19, 2018

(30) Foreign Application Priority Data

Mar. 27, 2015 (EP) ..................................... 15161232

(51) Int. Cl.
*B01J 27/055* (2006.01)
*B01J 21/08* (2006.01)
(Continued)

(52) U.S. Cl.
CPC ............. *B01J 27/055* (2013.01); *B01J 21/08* (2013.01); *B01J 23/22* (2013.01); *B01J 35/0006* (2013.01);
(Continued)

(58) Field of Classification Search
CPC ...... B01J 23/22; B01J 27/055; B01J 35/0026; B01J 35/023; B01J 35/026; B01J 37/0009;
(Continued)

(56) References Cited

U.S. PATENT DOCUMENTS

| | | | |
|---|---|---|---|
| 3,186,794 A * | 6/1965 | Davies | ..................... B01J 23/22 423/535 |
| 4,431,573 A * | 2/1984 | Fennemann | ............ C01B 17/79 502/218 |

(Continued)

FOREIGN PATENT DOCUMENTS

| | | |
|---|---|---|
| DE | 68919235 T2 | 3/1995 |
| DE | 69635919 T2 | 9/2006 |

(Continued)

OTHER PUBLICATIONS

English Translation of International Preliminary Report on Patentability for International Application No. PCT/EP2016/055670, dated Sep. 28, 2017.

(Continued)

*Primary Examiner* — Timothy C Vanoy
(74) *Attorney, Agent, or Firm* — Drinker Biddle & Reath LLP

(57) ABSTRACT

The invention relates to shaped catalyst bodies for the oxidation of $SO_2$ to $SO_3$, which comprise vanadium, at least one alkali metal and sulfate on a silicon dioxide support material, wherein the shaped body has the shape of a cylinder having 3 or 4 hollow-cylindrical convexities, (Continued)

obtainable by extrusion of a catalyst precursor composition comprising vanadium, at least one alkali metal and sulfate on a silicon dioxide support material through the opening of an extrusion tool, wherein the opening of the extrusion tool has a cross section formed by 3 or 4 partly overlapping rings whose midpoints lie essentially on a circular line having a diameter of y, wherein the rings are bounded by an outer line lying on a circle having an external diameter x1 and an inner line lying on a circle having an internal diameter x2.

10 Claims, 2 Drawing Sheets

(51) Int. Cl.
| | | |
|---|---|---|
| *B01J 35/00* | (2006.01) | |
| *B01J 35/04* | (2006.01) | |
| *B01J 37/00* | (2006.01) | |
| *B01J 23/22* | (2006.01) | |
| *B01J 35/02* | (2006.01) | |
| *B01J 35/10* | (2006.01) | |
| *C01B 17/79* | (2006.01) | |

(52) U.S. Cl.
CPC ......... *B01J 35/0026* (2013.01); *B01J 35/023* (2013.01); *B01J 35/026* (2013.01); *B01J 35/04* (2013.01); *B01J 35/1004* (2013.01); *B01J 37/0009* (2013.01); *B01J 37/0018* (2013.01); *C01B 17/79* (2013.01)

(58) Field of Classification Search
CPC .... B01J 37/0018; B01J 21/08; B01J 35/0006; B01J 35/04; B01J 35/1004; C01B 17/79
See application file for complete search history.

(56) References Cited

U.S. PATENT DOCUMENTS

| | | | |
|---|---|---|---|
| 4,485,190 A | | 11/1984 | Sherif |
| 4,539,309 A | | 9/1985 | Meissner et al. |
| 4,766,104 A | * | 8/1988 | Fennemann ............. B01J 23/22 502/218 |
| 5,017,542 A | | 5/1991 | Martan et al. |
| 5,034,369 A | * | 7/1991 | Hebrard ............. B01D 53/8612 423/570 |
| 5,082,819 A | | 1/1992 | Boeck et al. |
| 5,108,976 A | | 4/1992 | Cavalli et al. |
| 5,215,953 A | * | 6/1993 | Blumrich ........... B01D 53/8609 502/218 |
| 5,326,915 A | | 7/1994 | Viola et al. |
| 5,330,958 A | * | 7/1994 | Viola et al. |
| 5,939,351 A | | 8/1999 | Rubini et al. |
| 9,169,188 B2 | | 10/2015 | Macht et al. |
| 9,238,217 B2 | | 1/2016 | Welker-Nieuwoudt et al. |
| 9,434,673 B2 | | 9/2016 | Gruene et al. |
| 9,656,983 B2 | | 5/2017 | Kramer et al. |
| 9,695,099 B2 | | 7/2017 | Liu et al. |
| 9,700,876 B2 | | 7/2017 | Macht et al. |
| 9,714,227 B2 | | 7/2017 | Zakzeski et al. |
| 9,765,046 B2 | | 9/2017 | Fischer et al. |
| 9,868,713 B2 | | 1/2018 | Fischer et al. |
| 2009/0306410 A1 | | 12/2009 | Brandstädter et al. |
| 2010/0331571 A1 | * | 12/2010 | Saito ..................... B01J 23/002 562/532 |
| 2014/0343319 A1 | | 11/2014 | Goebel et al. |
| 2015/0246343 A1 | | 9/2015 | Hammon et al. |
| 2016/0122264 A1 | | 5/2016 | Olbert et al. |
| 2016/0152530 A1 | | 6/2016 | Grune et al. |
| 2016/0152531 A1 | | 6/2016 | Walsdorff et al. |
| 2016/0152532 A1 | | 6/2016 | Grune et al. |
| 2016/0347686 A1 | | 12/2016 | Grune et al. |
| 2016/0355450 A1 | | 12/2016 | Grune et al. |
| 2017/0008867 A1 | | 1/2017 | Galeano Nunez et al. |
| 2017/0121534 A1 | | 5/2017 | Tavares Andre et al. |
| 2017/0189875 A1 | | 7/2017 | Von Deak et al. |
| 2017/0233313 A1 | | 8/2017 | Grune et al. |
| 2017/0334809 A1 | | 11/2017 | Grune et al. |
| 2018/0002254 A1 | | 1/2018 | Josch et al. |
| 2018/0008962 A1 | | 1/2018 | Galeano Nunez et al. |

FOREIGN PATENT DOCUMENTS

| | | |
|---|---|---|
| DE | 69220225 T3 | 10/2006 |
| EP | 0019174 A2 | 11/1980 |
| EP | 0020963 A2 | 1/1981 |
| EP | 0129903 A2 | 1/1985 |
| EP | 0355664 A1 | 2/1990 |
| EP | 417722 A1 | 3/1991 |
| EP | 464633 A1 | 1/1992 |
| EP | 0732146 A1 | 9/1996 |
| WO | WO-2016/075065 A1 | 5/2016 |
| WO | WO-2016/151008 A1 | 9/2016 |
| WO | WO-2016/156042 A1 | 10/2016 |

OTHER PUBLICATIONS

International Preliminary Report on Patentability for PCT/EP2016/055670 dated Jul. 5, 2017.
Written Opinion of the International Searching Authority for PCT/EP2016/055670 dated Jul. 1, 2016.

* cited by examiner

SHAPED CATALYST BODY FOR THE CATALYTIC OXIDATION OF $SO_2$ INTO $SO_3$

CROSS-REFERENCE TO RELATED APPLICATIONS

This application is a national stage application (under 35 U.S.C. § 371) of PCT/EP2016/055670, filed Mar. 16, 2016, which claims benefit of European Application No. 15161232.2, filed Mar. 27, 2015, both of which are incorporated herein by reference in their entirety.

The invention relates to a shaped catalyst body for the oxidation of $SO_2$ to $SO_3$, a process for the production thereof and also its use in a process for the oxidation of $SO_2$ to $SO_3$.

Sulfuric acid is obtained virtually exclusively by oxidation of sulfur dioxide ($SO_2$) to sulfur trioxide ($SO_3$) in the contact/double contact process with subsequent hydrolysis. In this process, $SO_2$ is oxidized by means of molecular oxygen over vanadium-comprising catalysts in a plurality of consecutive adiabatic layers (trays) to form $SO_3$. The $SO_2$ content of the feed gas is usually in the range from 0.01 to 50% by volume and the ratio of $O_2/SO_2$ is in the range from 0.5 to 5. A preferred oxygen source is air. Part of the sulfur dioxide is reacted in the individual trays, with the gas being in each case cooled between the individual trays (contact process). $SO_3$ which has already been formed can be removed from the gas stream by intermediate absorption in order to achieve higher total conversions (double contact process). The reaction occurs, depending on tray, in a temperature range from 340° C. to 680° C., with the maximum temperature decreasing with increasing tray number because of the decreasing $SO_2$ content.

Modern-day commercial catalysts usually comprise not only vanadium but also alkali metal compounds, especially potassium compounds but optionally also sodium compounds and/or cesium compounds, and also sulfate. As supports for the abovementioned components, porous oxides, in particular silicon dioxide, $SiO_2$, are usually used. Under reaction conditions, an alkali metal pyrosulfate melt in which the active component vanadium is dissolved in the form of oxo-sulfate complexes is formed on the support material (Catal. Rev.—Sci. Eng., 1978, vol. 17(2), pages 203 to 272). This is referred to as a supported liquid phase catalyst.

The contents of vanadium, calculated as $V_2O_5$, are usually in the range from 3 to 10% by weight, the contents of alkali metals (M), calculated as $M_2O$, are from 5 to 30% by weight, with the molar ratio of alkali metal to vanadium (MN ratio) usually being in the range from 2 to 6. The content of potassium, calculated as $K_2O$, is usually in the range from 6 to 15% by weight and that of sulfate is in the range from 12 to 30% by weight. In addition, the use of numerous further additional elements, for example chromium, iron, aluminum, phosphorus, manganese and boron, has been reported. $SiO_2$ is predominantly used as porous support material.

The production of such catalysts on an industrial scale is usually carried out by mixing of aqueous solutions or suspensions of the various active components, for example appropriate vanadium compounds ($V_2O_5$, ammonium polyvanadate, ammonium metavanadate, alkali metal vanadates or vanadyl sulfates) with alkali metal salts (nitrates, carbonates, oxides, hydroxides, sulfates), sometimes together with sulfuric acid and other components which can function as pore formers or lubricants, for example sulfur, starch or graphite, with the support material. The composition resulting therefrom is processed to form the desired shaped bodies in the next step and finally treated thermally (drying and calcination).

U.S. Pat. No. 4,485,190 describes the production of a catalyst for the oxidation of $SO_2$ to $SO_3$, which comprises V, K and a silicon oxide compound. As shaped bodies, mention is made in column 2, lines 30 ff. and column 5, lines 62 ff. of, inter alia, trilobes. In column 6, lines 5 ff., it is said that trilobes have an 18% greater surface area without further information on the size of the shaped bodies being compared with one another being given. The shape of the trilobes mentioned is not described in more detail. Trilobes having through-passages are not mentioned. In the examples, no trilobes are produced.

DE 689 19 235 T2 describes a catalyst for the oxidation of $SO_2$ to $SO_3$, which comprises vanadium, potassium and a silicon oxide compound. On page 2, lines 2 ff., hollow or compact cylinders, multiply lobed cylinders, optionally with spiral depressions, are proposed as shaped bodies. Other shapes are not described.

EP 464 633 A1 describes a support for a catalyst for producing unsaturated esters. In FIGS. 4 and 5, trilobes having three through-passages are disclosed as possible supports and shaped bodies having more than three through-passages are disclosed in FIGS. 6 and 7. In the examples, only shaped bodies having one hole are described.

DE 692 20 225 T2 describes catalysts in the form of trilobes having 3 through-passages, in particular for preparing formaldehyde. The catalysts are obtained in the examples by tableting and have a defined length. A high actual surface area per unit volume and a low pressure drop are mentioned as advantageous properties.

DE 696 35 919 T2 describes catalysts in the form of trilobes having through-passages, in particular for preparing formaldehyde, which can be produced by extrusion or tableting. In the examples, the catalysts are produced by tableting and have a defined length.

US 2009/0306410 A1 describes catalysts in the form of trilobes having 3 through-passages, in particular for preparing maleic anhydride. The catalysts are obtained by tableting in the examples and have a defined length. A high actual surface area per unit volume and a low pressure drop are mentioned as advantageous properties.

EP 417 722 A1 describes catalysts for preparing unsaturated aldehydes. Shaped bodies having 3 or 4 through-passages are shown as examples in FIG. 1. In Example 4, shaped bodies having 3 through-passages are obtained by extrusion and are cut to a length of 5 mm. A geometric surface area per unit volume and the pressure drop are indicated for the shaped bodies.

It is an object of the invention to provide shaped catalyst bodies for the oxidation of $SO_2$ to $SO_3$, which have a very high volume-based geometric surface area. It is known that in the case of vanadium-comprising catalysts for the oxidation of $SO_2$ to $SO_3$, a large volume-based geometric surface area gives a high catalyst activity. Furthermore, the shaped catalyst bodies should give a very low pressure drop at a very high volume-based geometric surface area.

The object is achieved by shaped catalyst bodies for the oxidation of $SO_2$ to $SO_3$, which comprise vanadium, at least one alkali metal and sulfate on a silicon dioxide support material, wherein the shaped body has the shape of a cylinder having 3 or 4 hollow-cylindrical convexities, obtainable by extrusion of a catalyst precursor composition comprising vanadium, at least one alkali metal and sulfate on a silicon dioxide support material through the opening of an extrusion tool, wherein the opening of the extrusion tool has a cross section formed by 3 or 4 partly overlapping rings whose midpoints lie essentially on a circular line having a diameter of y, wherein the rings are bounded by an outer line lying on a circle having an external diameter x1 and an inner line lying on a circle having an internal diameter x2.

The influence of various shaped body geometries on the pressure drop is not intuitive. Surprisingly, it has been found, for example, that a "boomerang" shape produces a significantly higher pressure drop than an 11×4 mm star extrudate with hole at a virtually identical volume-based geometric surface area. On the other hand, a clover leaf shape according to the invention having 4 through-passages displays a virtually 27% higher specific surface area at an only 15% higher pressure drop compared to the star extrudate shape.

The outer and inner circles bounding the annular rings and thus the through-passages of the hollow-cylindrical convexities of the resulting shaped bodies are preferably concentric. However, this is not absolutely necessary. The circles and thus the through-passages of the hollow-cylindrical convexities can also be arranged eccentrically. In one embodiment of the invention, they are arranged eccentrically, i.e. the midpoints are different, for example the inner circles (or the through-passages) are shifted outward or inward. The midpoints of the outer circles are in this case essentially on the circular line. For the present purposes, "lying essentially on a circular line" means that the midpoints are located within a deviation of +/−20%, preferably within a deviation of +/−10%, on a circular line having the diameter y.

Figure 1A:
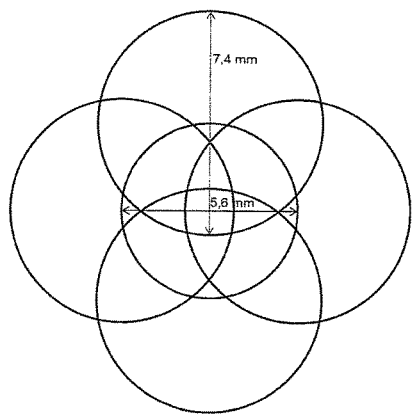
FIGS. 1*a* and 1*b* show embodiments of dies as disclosed in the Examples below.
Figure 1B:
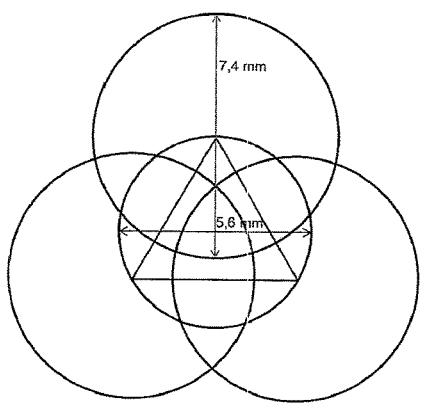
Figure 1C:
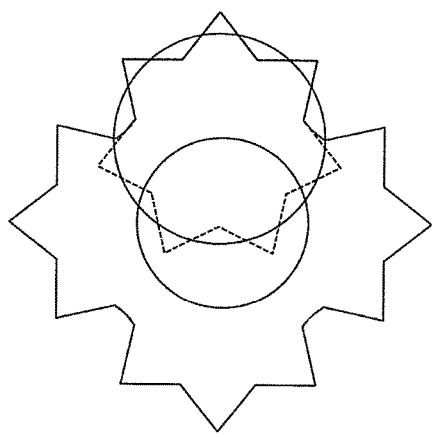
FIGS. 1*c*, 1*d*, and 1*e* show embodiments in which only the outer or only the inner or both bounding lines are wavy or zig-zag.
Figure 1D:
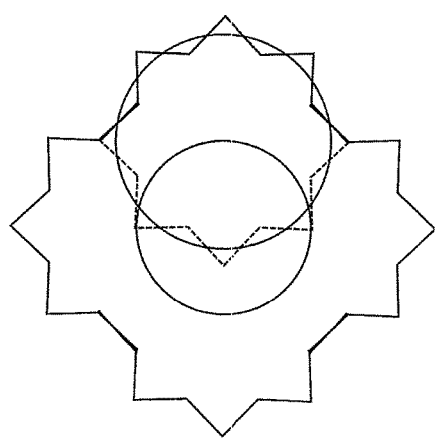
Figure 1E:
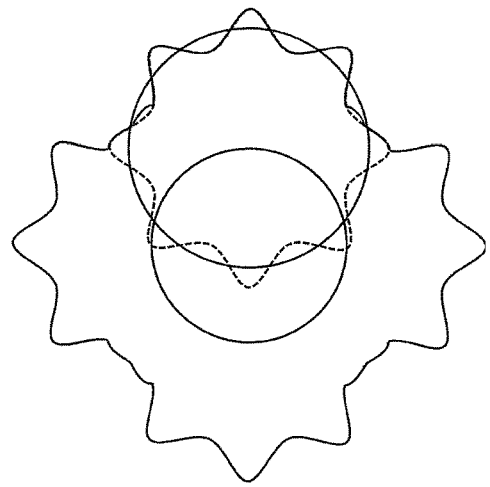

The opening of the extrusion tool has a cross section which is formed by 3 or 4 partly overlapping rings whose midpoints lie essentially on a circular line having the diameter y. The rings are bounded by an outer line lying on a circle having an external diameter x1 and an inner line lying on a circle having an internal diameter x2. The outer and inner lines which bound the rings and lie on a circle are preferably these circles themselves. Corresponding embodiments are shown in FIGS. 1a, 1b. However, the outer and/or inner lines can also be circular, wavy or circular, zig-zag lines which lie on the circles having the external diameter x1 or the internal diameter x2. The lines are located on a circle having the external diameter x1 or the internal diameter x2 when their distance from the midpoint of the circle fluctuates periodically, for example in the form of a wave or in the form of zig-zags, around the value x1 or x2, in general by not more than +/−25% of the respective value. In general, the external diameter x1 or the internal diameter x2 is then the average of this distance from the midpoint of the circle. It is possible for only the outer or only the inner or both bounding lines to be, for example, wavy or zig-zag. Corresponding embodiments are shown in FIGS. 1c to 1e.

In general, all annular rings of the cross section of the opening of the extrusion tool have the same external diameter x1 and the same internal diameters x2, i.e. the resulting hollow-cylindrical convexities and their through-passages have the same size. However, this is not absolutely necessary. The outer circles can also have diameters which are different from one another. The inner circles can likewise have diameters which are different from one another.

In a preferred embodiment, the cross section of the opening of the extrusion tool is formed by 3 annular rings, where the midpoints of the annular rings forming the cross section form an equilateral triangle. The resulting shaped bodies thus have 3 hollow-cylindrical convexities, with the midpoints of the annular rings forming the cross section (midpoints of the outer circles) essentially forming an equilateral triangle. However, this is not absolutely necessary. The midpoints of the annular rings forming the cross section can also form a triangle which is not equilateral (equalsided).

In a further preferred embodiment, the cross section of the opening of the extrusion tool is formed by 4 annular rings, with the midpoints of the annular rings forming the cross section forming an equilateral triangle. The resulting shaped bodies thus have 4 hollow-cylindrical convexities, with the midpoints of the annular rings forming the cross section (midpoints of the outer circles) essentially forming a square. However, this is not absolutely necessary. The midpoints of the annular rings forming the cross section can also form a simple rectangle.

The ratio of the external diameter of the annular rings forming the cross section to the diameter of the circular line x1:y is preferably from 0.8:1 to 2:1, particularly preferably from 1:1.2 to 1.4:1. This ratio is reflected in the resulting shaped bodies.

The ratio of the external diameter to the internal diameter of the annular rings x1:x2 is preferably from 1.5:1 to 5:1, in particular from 2:1 to 3:1. This ratio is reflected in the resulting shaped bodies.

The ratio of the average length z of the shaped bodies to the external diameter of the annular rings z:x1 is preferably from 1:1 to 6:1, particularly preferably from 1.5:1 to 3:1. This ratio is reflected in the resulting shaped bodies.

In particularly preferred embodiments, the shaped catalyst bodies of the invention have one or more of the features (i) to (iv):
(i) diameter y of the circular line in the range from 4 to 9 mm, preferably from 4 to 6 mm;
(ii) external diameter x1 in the range from 5.5 to 11 mm, preferably from 5.5 to 9 mm;
(iii) internal diameter x2 in the range from 2.2 to 7 mm, preferably from 2.2 to 4 mm;
(iv) average length z in the range from 10 to 35 mm, preferably from 10 to 25 mm.

The difference between the external diameter x1 and the internal diameter x2 is preferably such that a wall thickness of the hollow-cylindrical convexities in the range from 1.3 to 3 mm is obtained.

The shaped catalyst bodies of the invention can be produced by extrusion of a corresponding catalyst precursor composition comprising vanadium, at least one alkali metal and sulfate on a silicon dioxide support material through an extrusion tool which represents the geometry of the cross section of the shaped body. The cross section of the opening of the extrusion tool accordingly has an ideal geometry formed by 3 or 4 partly overlapping annular rings which are bounded by an outer circle having an external diameter x1 and an inner circle having an internal diameter x2 and whose midpoints lie on a circular line having the diameter y.

The ideal shape of the shaped bodies of the invention is defined by the geometry of the extrusion tool through which the catalyst precursor composition is extruded. Of course, the geometry of actual extruded shaped bodies deviates from this ideal shape, but the actual shaped bodies have essentially the above-described geometric features. In general, the axes of the hollow-cylindrical convexities are parallel. However, the actual shaped bodies can, for example, be slightly curved in the z direction. The holes (through-passages) of the shaped bodies of the invention can deviate from a perfect circular shape. If a large number of actual shaped bodies is present, individual through-passages in some shaped bodies can be closed. In general, the end face of the shaped bodies in the xy plane is, due to the production process, not a smooth surface but more or less irregular. The length of the shaped bodies in the z direction (maximum extension in the z direction) is generally not equal for all shaped bodies but instead has a distribution which is characterized by an average length z (arithmetic mean).

The invention also provides a process for producing shaped catalyst bodies comprising vanadium, at least one alkali metal and sulfate on a silicate support material from a catalyst precursor composition comprising vanadium, at least one alkali metal and sulfate on a silicate support material by extrusion of a catalyst precursor composition comprising vanadium, at least one alkali metal and sulfate on a silicon dioxide support material through the opening of an extrusion tool, wherein the opening of the extrusion tool has a cross section formed by 3 or 4 partly overlapping annular rings which are bounded by an outer circle having an external diameter x1 and an inner circle having an internal diameter x2 and whose midpoints lie on a circular line having the diameter y.

In general, the catalysts comprise not only vanadium but also alkali metal compounds, especially potassium compounds but optionally also sodium compounds and/or cesium compounds, and also sulfate. Porous oxides such as silicon dioxide, $SiO_2$, are used as support for the abovementioned components.

As inert support materials, use is made of, in particular, porous materials based on $SiO_2$. Here, it is possible to use synthetic variants of $SiO_2$ and also natural forms of $SiO_2$ or mixtures thereof.

The content of vanadium, calculated as $V_2O_5$, is generally from 3 to 10% by weight, the content of alkali metals (M), calculated as $M_2O$, is from 5 to 30% by weight, with the molar ratio of alkali metal to vanadium (M/V ratio) usually being in the range from 2 to 6. The content of potassium, calculated as $K_2O$, is usually in the range from 6 to 15% by weight and the content of sulfate is in the range from 12 to 30% by weight. In addition, it is possible for further elements such as chromium, iron, aluminum, phosphorus, manganese and boron to be comprised.

A preferred support material comprises naturally occurring diatomaceous earth. The support material particularly preferably comprises at least two different naturally occurring, uncalcined diatomaceous earths which differ in terms of the structure type of the diatoms on which they are based, with the various structure types being selected from plate-shaped, cylindrical and rod-shaped structure types.

The catalysts produced therefrom have a particularly good mechanical stability.

Preferred diatomaceous earths should have a content of aluminum oxide $Al_2O_3$ of less than 5% by weight, preferably less than 2.6% by weight and in particular less than 2.2% by weight. Their content of iron(III) oxide $Fe_2O_3$ should be less than 2% by weight, preferably less than 1.5% by weight and in particular less than 1.2% by weight. Their total content of alkaline earth metal oxides (magnesium oxide MgO+calcium oxide CaO) should be less than 1.8% by weight, preferably less than 1.4% by weight and in particular less than 1.0% by weight.

Uncalcined diatomaceous earth has not been treated at temperatures above 500° C., preferably not above 400° C. and in particular not above 320° C., before mixing with the active components. A characteristic feature of uncalcined diatomaceous earth is that the material is essentially amorphous, i.e. the content of cristobalite is <5% by weight, preferably <2% by weight and particularly preferably <1% by weight, determined by X-ray diffraction analysis.

Of course, the naturally occurring, uncalcined diatomaceous earth can have been subjected to various treatment steps apart from calcination, for example slurrying, washing, extraction, drying and/or sifting, after mining and before use as support material.

The average volume-based pore diameter, determined by means of mercury porosimetry, of the various diatomaceous earths which can be used should be in the range from 0.1 μm to 10 μm, preferably from 0.5 μm to 9 μm and in particular from 0.7 μm to 7 μm. The average volume-based pore diameter of the mixtures of uncalcined diatomaceous earths should be in the range from 0.5 μm to 9 μm, preferably from 0.8 to 7 μm and in particular from 0.9 to 5 μm. Here, the shape of the pore distribution of the mixtures according to the invention can deviate significantly from that of the individual diatomaceous earths. Bimodal pore distributions or pore distributions having pronounced shoulders can result, depending on the combination of the various diatomaceous earths. The setting of a particular average volume-based pore diameter within the above-described limits is in principle possible by means of mixing of different diatomaceous earths in various ratios.

The production of the catalysts is effected by mixing aqueous solutions or suspensions of the various active components, for example appropriate vanadium compounds ($V_2O_5$, ammonium polyvanadate, ammonium metavanadate, alkali metal vanadates or vanadyl sulfates) with alkali metal salts (nitrates, carbonates, oxides, hydroxides, sulfates), optionally with sulfuric acid and other components which can function as pore formers or lubricants, for example sulfur, starch or graphite, with the support material. The mixing operation is not restricted further and can, for example, be carried out in a kneader, a screw mixer, a paddle mixer or a "Mix Muller" in which the components are mixed by means of rotating wheels and scrapers.

The resulting composition is, in the next step, extruded to give the shaped bodies according to the invention, dried and calcined. The type of extruder is not restricted further here. It is possible to use, for example, ram extruders, screw extruders, cascade extruders or planetary gear extruders. Preference is given to using screw extruders, in particular screw extruders having one or two screw shafts. The screw shafts can be optimized in respect of their geometry, for example in respect of their nominal diameter, the flight depth and/or the pitch, so that they produce very uniform extrudates. The material of the screw shaft or its surface and also the material of the barrel or its surface and of the extrusion tool or its surface can, for example, be optimized so that it has a very high resistance to the composition to be extruded. Owing to the low pH of the composition, corrosion- and acid-resistant materials are particularly preferred. The materials to be processed can be continuously or discontinuously supplied to the screw from above via a hopper. Reproducible metering and fill height in the hopper can lead to improved quality of extrusion.

The type of extrusion is likewise not restricted further. For example, cold extrusion, warm extrusion or hot extrusion can be used. At the inlet into the extruder, the composition to be extruded typically has a temperature of from 10 to 90°

C. The extruder housing with the barrel can be cooled by means of a cooling medium, for example water, in order to prevent components from being deformed by excessively high temperatures. In such a case, the temperature of the cooling medium fed to the extruder is typically from 0 to 80° C. The temperature of the extrudate immediately after leaving the extruder is typically from 10 to 90° C. The speed of rotation of the screw is typically from 1 to 100 revolutions per minute, often from 2 to 30 revolutions per minute. The pressure in the extruder upstream of the extrusion tool is typically from 20 to 500 bar. The torque imparted by the screw is typically from 50 to 5000 Nm.

Extrusion tools can consist of one or more components. In a preferred embodiment, they consist of a die and insert pins, with the die as far as possible, determining the shape, size and position of the outer circles and the insert pins determining the shape, size and position of the inner circles. The insert pins can be inserted into the die. The translatory and rotary centering of the insert pins in the dies can be achieved by means of a suitable construction of die and insert pins, for example by means of a groove in one component and a tongue in the other component. Centering can also be effected with the aid of an additional centering tool.

If the extrusion tool consists of a plurality of components, the components can consist of the same material or of different materials. In a preferred embodiment, the die consists of a very acid-resistant plastic, for example PTFE and the insert pins consist of an acid-resistant stainless steel. The dies can be produced inexpensively by, for example, injection molding.

The shaped bodies are generally subjected to a drying step after extrusion. Here, the type of oven is not restricted further. It is possible to use, for example, stationary convection ovens, rotary tube ovens or belt ovens. The duration of drying is generally from 0.5 to 20 hours and the temperature is generally from 50 to 200° C.

The shaped bodies are generally subjected to a calcination step after drying. Here, the type of oven is not restricted further. It is possible to use, for example, stationary convection ovens, rotary tube ovens or belt ovens. The duration of calcination is generally from 0.5 to 20 hours and the temperature is generally from 200 to 800° C.

After the calcination or even at other points during the process for producing the catalyst, it can be advantageous to sort the shaped bodies according to their dimensions and utilize only a suitable size fraction. Such sorting can be effected, for example, by means of suitable sieves. Shaped bodies which are larger or smaller than the desired dimensions can, for example, be recirculated as recycle material to suitable points in the process. It can be advantageous to subject this recycle material to one or more further process steps, for example milling, before recirculation.

The present invention also provides for the use of the shaped catalyst bodies for the oxidation of $SO_2$ to $SO_3$.

The present invention further provides a process for the oxidation of $SO_2$ to $SO_3$, wherein a gas mixture comprising oxygen and sulfur dioxide is brought into contact at a temperature in the range from 340 to 680° C. with a bed of the shaped catalyst bodies of the invention.

Tray reactors (see, for example, "H. Müller, Sulfuric Acid and Sulfur Trioxide in Ullmann's Encyclopedia of Industrial Chemistry, Wiley-VCH, 2012"; DOI: 10.1002/14356007.a25_635) are typically used as reactors. These tray reactors have a plurality of reaction trays in which $SO_2$ is brought into contact with shaped catalyst bodies. The reactor typically comprises from 1 to 6, usually from 3 to 5, trays. The tray reactors generally behave approximately adiabatically, i.e. the heat liberated in the oxidation of $SO_2$ to $SO_3$ largely heats the reaction gas. The exothermic oxidation of $SO_2$ to $SO_3$ is limited by thermodynamic equilibrium which is shifted in the direction of the starting materials with increasing temperature. After passage through a tray, the reaction gas is therefore cooled, for example in suitable heat exchangers, before being fed to the next tray. Furthermore, there are processes in which the $SO_3$ formed is largely removed from the reaction gas, for example by absorption in concentrated sulfuric acid, between two trays in order to increase the conversion of remaining $SO_2$ in the subsequent trays.

The concentration of $SO_2$ in the reaction gas before the latter enters the first tray is generally from 2 to 20% by volume; depending on $SO_2$ source, it is typically in the range from 5 to 15% by volume. The concentration of 02 in the reaction gas before the latter enters the first tray is likewise generally 2-20% by volume; depending on $SO_2$ source, it is typically in the range from 5 to 15% by volume. The volume flows are generally from 10 000 to 500 000 standard $m^3$/h, typically from 30 000 to 350 000 standard $m^3$/h. The diameter of the reactors is typically from 2 to 15 m, normally from 3 to 10 m. The volume of the catalytic bed per tray is generally from 10 to 500 $m^3$, usually from 20 to 350 $m^3$. The height of the catalytic bed per tray is generally from 0.3 to 3 m, typically from 0.5 to 2.5 m. The space velocity of gas in standard $m^3$/h, based on the catalyst volume in $m^3$ (GHSV), is generally from 100 to 5000 $h^{-1}$, usually from 500 to 2500 $h^{-1}$. The flow is typically in the laminar range, and the Reynolds number of the flow in the tray is generally from 10 to 1000, typically from 30 to 500. The pressure drop over the bed in a tray is generally from 2 to 100 mbar, typically from 5 to 50 mbar.

It is economically advantageous for the pressure drop over the process, in particular over reactor, heat exchanger and optionally absorption tower, to be low in order to have low costs for compression of the reaction gas and in order to minimize the pressure rating requirements for the components. A catalytic bed which displays a low pressure drop and a high activity is advantageous here.

The invention is illustrated in more detail by the following examples.

EXAMPLES

Example 1

Production of the Catalyst Composition 0.8991 kg (30% by weight based on the mixture of the diatomaceous earths) of a diatomaceous earth of the type MN from EP Minerals, 1.4985 kg (50% by weight based on the mixture of the diatomaceous earths) of a diatomaceous earth of the type Masis from Diatomite SP CJSC and 0.5994 kg (20% by weight based on the mixture of diatomaceous earths) of a diatomaceous earth of the type Diatomite 1 from Mineral Resources Ltd are mixed for 30 minutes at 45 revolutions per minute in a drum hoop mixer (from Engelsmann, container volume 32 liters). The mixture of the diatomaceous earths is placed in a Mix-Muller (from Simpson, year of construction 2007, container volume 30 liters) and processed for 2 minutes at 33 revolutions per minute. A first solution consisting of 1.3706 kg of aqueous KOH solution (47.7% by weight) and 0.532 kg of ammonium polyvanadate (from Treibacher) is then added over a period of 2 minutes and the mixture is processed further for 1 minute. 2.1025 kg of 48 percent strength sulfuric acid is added over a period of 2 minutes and the mixture is processed for a further minute at 33 revolutions per minute. As next step, 0.3 kg of $K_2SO_4$ (from K+S Kali GmbH) is introduced into 1.587 kg of a 50 percent strength aqueous $Cs_2SO_4$ solution, introduced over a period of 2 minutes into the Mix-Muller and processed for 1 further minute at 33 revolutions per minute and 180 g of a starch solution (7.39% by weight of potato starch in DI water) are then added while continuing to process. The composition obtained is processed further at 33 revolutions per minute until the total processing time from introduction of the diatomaceous earth is 15 minutes altogether.

Comparative Example

The geometry of the horizontal projection of the shaped body according to the invention is determined by a die through which the composition to be extruded is conveyed under high pressure. The pressure drop of the industrial shaped bodies is influenced by many reality effects, for example the curvature of the shaped bodies, the precise length distribution, the fracture properties and the resulting nature of the shaped body, in particular of the end faces. These properties can depend on the geometry of the shaped body cross section or the geometry of the die used.

For comparison of the pressure drops of different actual shaped bodies, the pressure drops have to be determined experimentally. In industrial production, star extrudates having 7 points, an external diameter to the peaks of the points of 11 mm and a central hole having a diameter of 4 mm are extruded.

A screw extruder with a screw was used here. The introduction of solids into the screw is effected from above. The extruder is cooled by means of water. The rotation speed of the transport screw in the extruder is 10 revolutions per minute. The temperature of the solid on introduction and of the shaped bodies on leaving the extruder is about 50° C. The throughput through one extruder is 6000 kg per day. Since, inter alia, the speed of transport of the extrudates is not constant, a uniform length is not obtained but instead a length distribution is obtained. Furthermore, the average length is dependent on the geometry of the die. The shaped bodies were subsequently dried at 120° C. for 2 hours and calcined at 475° C. for 3 hours. Oversize and undersize shaped bodies are removed by means of screening devices.

For each die shape, a total of at least 100 shaped bodies were selected randomly, the longest length dimension of each shaped body was determined and the average was taken as the average length of the given shaped body. The average surface area of a given body having the average length was then calculated assuming an idealized geometry without curvature along the z axis and a smooth xy plane at right angles to the z axis.

Furthermore, the total weight of these shaped bodies and the average weight (arithmetic mean) of a shaped body were determined.

The bulk density of the shaped catalyst bodies was determined in a 500 mm long glass tube having an internal diameter of 200 mm.

The surface area density (in $m^{-1}$) was then calculated as (bulk density×average surface area)/average weight.

The pressure drop coefficient of the shaped catalyst bodies was determined in a 500 mm long glass tube having an internal diameter of 200 mm. The tube was charged for this purpose with the appropriate catalyst samples and the pressure drop was measured relative to ambient pressure at various volume flows of air at room temperature.

The pressure drop coefficient ξ is proportional to the pressure drop and is defined as $$\xi = \frac{\Delta p}{H} \cdot d_K \cdot \frac{2}{\rho \cdot w^2}$$

with the pressure drop $\Delta p$ in pascal, the bed height H in meters, the constant reference length $d_K$ of 0.01 meters, the average gas density $\rho$ in $kg/m^3$ and the average superficial gas velocity w.

The pressure drop coefficient ξ can be described using the following equalization function:

$$\zeta_K = a + \frac{b}{Re}$$

where the Reynolds number is defined as $$Re = \frac{w \cdot d_K \cdot \rho}{\eta}$$

with the dynamic viscosity of the gas q in pascal seconds.

The parameters a and b can be obtained by linear regression from the experimental values. Typical Reynolds numbers in a sulfuric acid reactor are about 100.

The characteristic physical catalyst parameters cutting hardness and abrasion were determined by the methods described in EP 0019174.

Examples 2 to 4

Figure 2A:
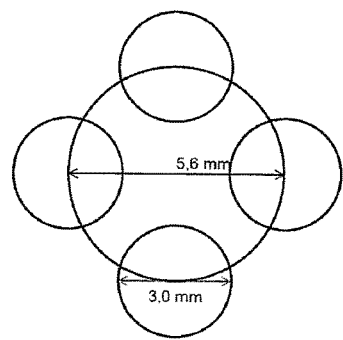
FIGS. 2*a*, 2*b*, and 2*c* show corresponding insert pins as disclosed in the Examples below.

Dies as per FIGS. 1a and 1b and also matching insert pins as per FIG. 2a (Example 2), 2b (Example 3) and 2c (Example 4) were made.

Figure 2B:
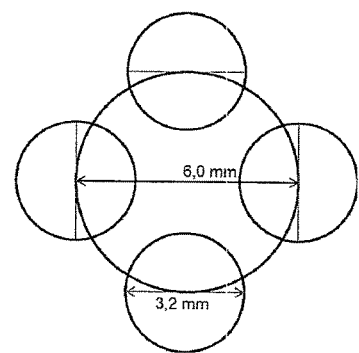
Figure 2C:
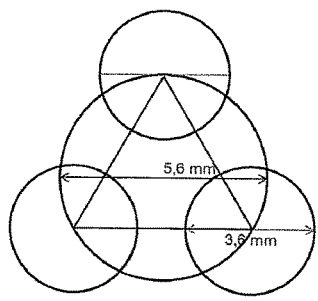

Thus, y=5.6 mm and x1=7.4 mm (FIGS. 1a and 1b), y=5.6 and x2=3 mm (FIG. 2a), y=6.0 and x2=3.2 mm (FIG. 2b) or y=5.6 mm and x2=3.6 mm (FIG. 2c). According to FIG. 2b (Example 3), the inner circles of the annular rings are arranged eccentrically relative to the die 1a.

Shaped bodies were extruded using these dies in industrial production in a manner analogous to the comparative example.

Further processing was likewise carried out in a manner analogous to the comparative example.

Length, average surface area, bulk density, average weight, surface area density, the parameters a and b, the relative surface area density based on the star extrudate, the relative pressure drop coefficient (zeta$_{rel}$ at Re=100 [%]) based on the star extrudate, the cutting hardness and the abrasion are reported in the following table.

|  | Comparative Example 1 | Example 2 | Example 3 | Example 4 |
| --- | --- | --- | --- | --- |
|  | Star 11 × 4 | Cloverleaf4 13 × 3 | Cloverleaf4, 13 × 3.2 | Cloverleaf3, 13 × 3.6 |
| Length [mm] | 16.9 | 16.5 | 18.0 | 20.0 |
| Surface area [m$^2$/body] | 1.07 10$^{-3}$ | 1.454 10$^{-3}$ | 1.608 10$^{-3}$ | 1.606 10$^{-3}$ |
| Bulk density [kg/m$^3$] | 420 | 440 | 439 | 437 |
| Weight [g/body] | 1.264 | 1.475 | 1.564 | 1.557 |
| Surface area density [m$^2$/m$^3$] | 356 | 433 | 451 | 451 |
| a | 14.24 | 15.55 | 17.47 | 16.78 |
| b | 684 | 962.36 | 668.01 | 1635.68 |
| Rel. surface area density [%] | 100 | 122 | 127 | 127 |
| zeta$_{rel}$ at Re = 100 [%] | 100 | 119 | 115 | 157 |
| Cutting hardness | 86 | 109N | 101N | 98N |
| Abrasion | 1.6% | 1.4% | 0.7% | 0.8% |

It can be seen that the surface area density of the catalysts of Examples 2 to 4 is 122% or 127% of the surface area density of the catalyst of Comparative Example 1. The increase in the surface area density is associated with an only moderate increase in the pressure drop coefficient at a Reynolds number of 100, which is proportional to the pressure drop established in an industrial reactor under typical reaction conditions of the SO$_2$ oxidation. The pressure drop coefficient of the catalysts of Examples 2-4 at a Reynolds number of 100 is only 119%, 115% or 157%, respectively, of the pressure drop coefficient of the catalyst of Comparative Example 1. The increase in the pressure drop coefficient for the catalysts having four holes (Examples 2 and 3) is lower than that for the catalyst having three holes. The cutting hardness of the catalysts according to the invention of Examples 2 to 4 is greater than that of the catalyst of Comparative Example 1, whereas the abrasion is lower. Accordingly, the mechanical properties of the catalysts according to the invention are likewise superior to the prior art.

The invention claimed is:

1. A shaped catalyst body for the oxidation of SO$_2$ to SO$_3$, which comprises vanadium, at least one alkali metal and sulfate on a silicon dioxide support material, wherein the shaped body has the shape of a cylinder having 4 hollow-cylindrical convexities, obtainable by extrusion of a catalyst precursor composition comprising vanadium, at least one alkali metal and sulfate on a silicon dioxide support material through the opening of an extrusion tool, wherein the opening of the extrusion tool has a cross section formed by 4 partly overlapping rings whose midpoints lie essentially on a circular line having a diameter of y, wherein the rings are bounded by an outer circle having an external diameter x1 and an inner circle having an internal diameter x2.

2. The shaped catalyst body according to claim 1, wherein the cross section is formed by 4 annular rings and the midpoints of the rings forming the cross section form a square.

3. The shaped catalyst body according to claim 1, wherein the ratio of the external diameter of the rings to the diameter of the circular line x1:y is from 0.8:1 to 2:1.

4. The shaped catalyst body according to claim 1, wherein the ratio of the external diameter to the internal diameter of the rings x1:x2 is from 1.5:1 to 5:1.

5. The shaped catalyst body according to claim 1, wherein the ratio of the average length z of the shaped bodies to the external diameter of the rings z:x1 is from 1:1 to 6:1.

6. The shaped catalyst body according to claim 1, wherein outer circles and inner circles of the rings are concentric.

7. The shaped catalyst body according to claim 1, wherein all rings have the same external diameter x1 and the same internal diameters x2.

8. The shaped catalyst body according to claim 1 having one or more of the features (i) to (iv):
   (i) diameter y of the circular line in the range from 4 to 9 mm;
   (ii) external diameter x1 in the range from 5.5 to 11 mm;
   (iii) internal diameter x2 in the range from 2.2 to 7 mm;
   (iv) average length z of the shaped bodies in the range from 10 to 35 mm.

9. A process for producing shaped catalyst bodies comprising vanadium, at least one alkali metal and sulfate on a silicate support material from a catalyst precursor composition comprising vanadium, at least one alkali metal and sulfate on a silicate support material by extrusion of a catalyst precursor composition comprising vanadium, at least one alkali metal and sulfate on a silicon dioxide support material through the opening of an extrusion tool, wherein the opening of the extrusion tool has a cross section formed by 4 partly overlapping annular rings which are bounded by an outer circle having an external diameter x1 and an inner circle having an internal diameter x2 and whose midpoints lie on a circular line having the diameter y.

10. A process for the oxidation of SO$_2$ to SO$_3$, wherein a gas mixture comprising oxygen and sulfur dioxide is brought into contact at a temperature in the range from 340 to 680° C. with a bed of shaped catalyst bodies according to claim 1.

* * * * *